US007172006B2

(12) United States Patent
Day et al.

(10) Patent No.: US 7,172,006 B2
(45) Date of Patent: Feb. 6, 2007

(54) PILE WEATHERSTRIPPING DUST PLUGS

(75) Inventors: Peter E. Day, Canandaigua, NY (US); Kevin R. Gale, Farmington, NY (US); Grant E. Wylie, Honeoye, NY (US)

(73) Assignee: Ultrafab, Inc., Farmington, NY (US)

( * ) Notice: Subject to any disclaimer, the term of this patent is extended or adjusted under 35 U.S.C. 154(b) by 0 days.

(21) Appl. No.: 10/941,410

(22) Filed: Sep. 15, 2004

(65) Prior Publication Data

US 2006/0057329 A1 Mar. 16, 2006

(51) Int. Cl.
*B29C 65/50* (2006.01)

(52) U.S. Cl. ...................... 156/445; 156/443; 156/545; 156/544; 156/554

(58) Field of Classification Search ................ 156/543, 156/544, 545, 554, 176, 178, 179, 72, 443, 156/445
See application file for complete search history.

(56) References Cited

U.S. PATENT DOCUMENTS 3,175,256 A 3/1965 Horton
3,481,802 A * 12/1969 Marcell ...................... 156/52
4,148,953 A 4/1979 Horton
4,288,483 A 9/1981 Miska et al.
4,302,494 A 11/1981 Horton
5,338,382 A 8/1994 Johnson et al.
5,447,590 A * 9/1995 Gilpatrick .................. 156/178
5,681,637 A 10/1997 Kessler et al.

* cited by examiner

*Primary Examiner*—George Koch
(74) *Attorney, Agent, or Firm*—Kenneth J. Lukacher; Martin Lukacher

(57) ABSTRACT

Dust plugs provide seals for openings in door frames and window frames to seal against air or water infiltration. The dust plugs are made continuously and automatically by feeding several weatherstrips having piles extending from rigid backing through a tool having side by side slots there through which extend from an anvil surface thereof. The backing strips rest on the surface in edge-to-edge relationship. An adhesive tape having a contact adhesive on one side thereof is fed synchronously with the pile weatherstripping in juxtaposition with the weatherstrips and in contact with the exposed sides of the backing strips. The dust plug material consists of the tape in contact with the weatherstrips and provides an assembly of the weatherstrips and the tape. Counter rotating puller belts engage dust plug material which may then be wound on a reel. For installation of the dust plug, the dust plug material is unwound from the reel and cut into dust plugs of desired length. Guides on upstream and downstream ends of the tool bring the tape into contacting relationship with the weatherstrips to provide the assembled dust plug material.

6 Claims, 3 Drawing Sheets

PILE WEATHERSTRIPPING DUST PLUGS

The present invention relates to pile weatherstripping dust plugs, and particularly to lengths of pile weatherstripping which are assembled adjacent to each other to provide a block seal or dust plug, and especially dust plugs made in accordance with a process which enables automatic, efficient, rapid, continuous and low cost fabrication of the dust plugs. The dust plugs provided by the invention may be located at the bottom of a doorjamb or on the side of a window sash in the frame of a window. Such dust plugs seal against air or water infiltration in an area where gaps may be left between the door or window and the frame thereof by other weatherstripping.

This invention is related to another invention in the field of dust plugs which inventions are commonly owned. The related invention is described in International Patent Application No. PCT/US04/12558, filed Apr. 23, 2004.

Heretofore pile weatherstripping dust plugs have been made from separate segments of pile assembled to a base by ultrasonic welding. The cost of fabricating such weatherstripping dust plugs is higher than desirable. It is the object of this invention to provide weatherstripping dust plugs which are dimensionally consistent and reliable in use, even when assembled without ultrasonic welding. It is a feature of the present invention to provide dust plugs made by a process which facilitates the automated continuous manufacture of dust plugs from several continuous lengths of pile weatherstripping and at a cost sufficiently low to increase the market for such dust plugs.

Briefly described, the present invention provides a dust plug made from a plurality of weatherstrips, each having a backing strip from which the pile extends. These dust plugs are made by pulling the weatherstrips through slots in a tool (or tooling) that provides an anvil surface so that the weatherstrips are guided with adjacent edges of their backing strips in alignment, and preferably in contacting relationship. The sides of the backings opposite to the pile are disposed on the anvil surface and are exposed. A tape, having a side with contact adhesive is transported continuously, in synchronism with the pile weatherstrips and into contact relationship with the exposed sides of the backing strips on the anvil surface. The synchronous transportation or feeding of the weatherstrips and the tape may be obtained by pulling the tapes downstream of the tool between counter rotating belts. The assembly of weatherstrips and tapes may be reeled for storage and lengths may be unwound from the reel and cut into pile weatherstripping dust plugs of desired length. Preferably the tool has a large number of slots so as to receive a selected number of pile weatherstrips with the piles hanging downwardly into these slots which provide clearance for the movement of the piles. The number of piles which are assembled by the tool determines the width of the dust plugs.

The pile weatherstripping which is assembled in edge-to-edge relationship with the adhesive tape so as to provide material for the dust plugs provided by the invention may be of the type described in U.S. Pat. No. 4,148,953, issued Apr. 10, 1979 to Robert C. Horton, U.S. Pat. No. 4,302,494, issued Nov. 24, 1981 also to Robert C. Horton, and U.S. Pat. No. 5,338,382, issued Aug. 16, 1994 to Larry E. Johnson. Such pile weatherstripping is commercially available from Ultrafab, Inc. of Farmington, N.Y., USA.

By virtue of the use of the tooling which guides the weatherstrips into assembled relationship with the adhesive tape to receive the tape into contacting relationship, dust plugs are provided that have dimensional stability and reliability in use as well as manufacturability at low cost. Selected ones or all of the pile weatherstripping may have an air and water infiltration barrier, sometimes called a fin, either inside the pile or outside the pile. Such weatherstrips are shown in the above referenced patents and are available from Ultrafab, Inc. The width of the dust plugs may be increased by increasing the number of pile weatherstrips which are fed through the tooling. The lengths of the dust plugs may be selected by cutting the continuous dust plug material to desired length.

The foregoing and other objects, features and advantages of the invention will become more apparent from a reading of the following description in connection with the accompanying drawings in which.

Figure 1:
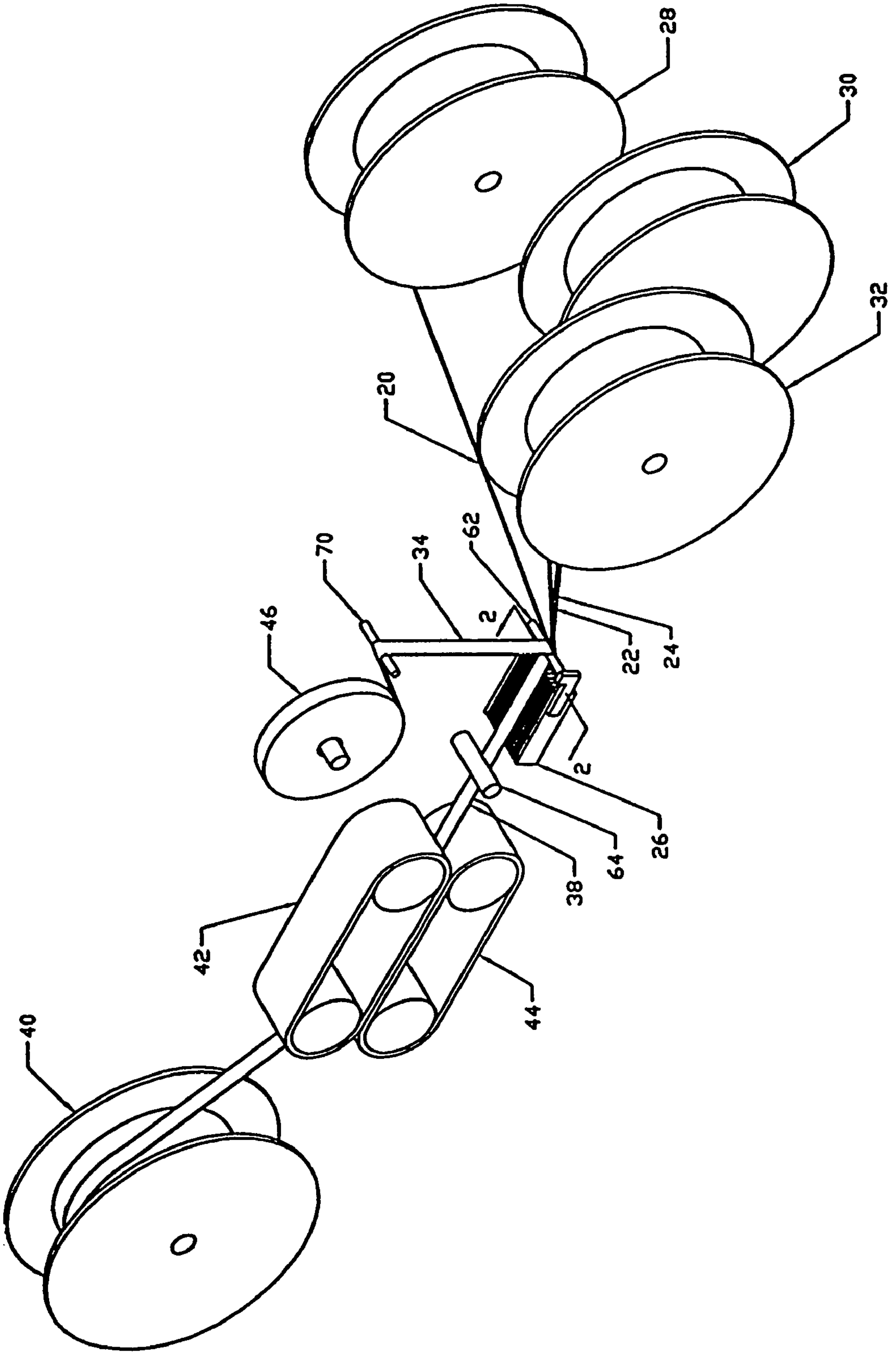
FIG. 1 is a diagrammatic, perspective view of the process whereby pile weatherstrip dust plug material may be provided in accordance with the invention.

Referring to FIG. 1, there is shown the apparatus which carry out the process of making dust plug material in accordance with the invention. The drawings illustrate the use of the invention in making dust plugs from three similar pile weatherstrips 20, 22 and 24. It will be appreciated that dust plugs may be made from increasing the number of pile weatherstrips and that the apparatus includes an anvil tool 26, which has facilities for handling more than three weatherstrips. The tool 26 may be modified to handle weatherstrips of identical dimensions as shown or other dimensions by modification of the tool to handle such other weatherstrips.

The weatherstrips 20, 22 and 24 are fed off spools or reels 28, 30 and 32. The weatherstrips 20, 22 and 24 and an adhesive tape 34 which assembles the dust plug material 38 are fed or advanced from the upstream end of the process at the spools 28, 30 and 32 to a windup spool or reel 40, which may be independently driven through a slip clutch, if desired. The weatherstrips 20, 22 and 24 and the tape 34 are driven synchronously by being fed together through counter rotating puller belts 42 and 44. The puller belts also automatically dispense the tape 34 from a spool 46 thereof. The puller belts define a nip through which passes the assembled weatherstrips and tape.

Figure 2:
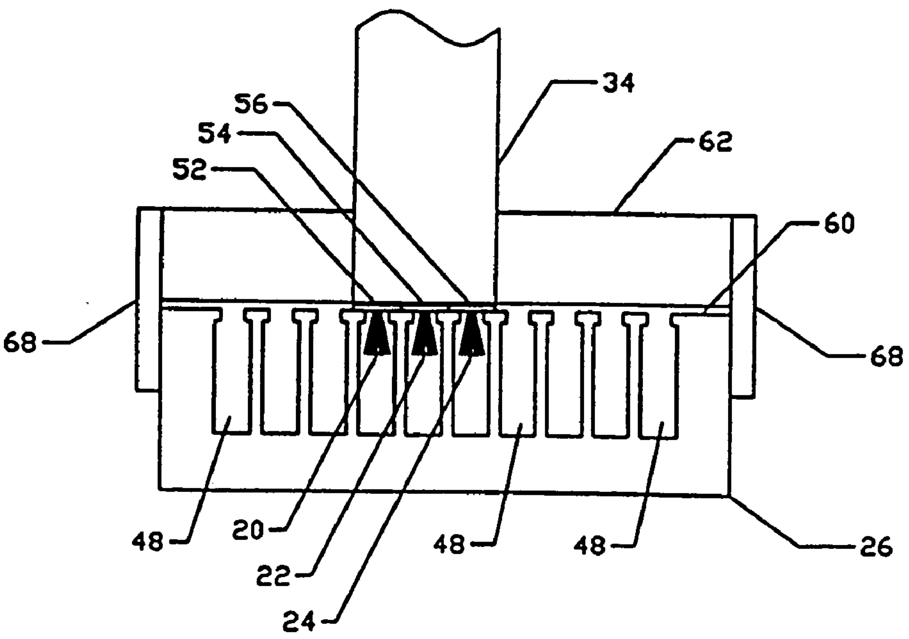
FIG. 2 is a sectional view along line 2—2 of FIG. 1 in the direction of the arrows intersecting that line, which shows the upstream end of the anvil-providing tool of FIG. 1.
Figure 3:
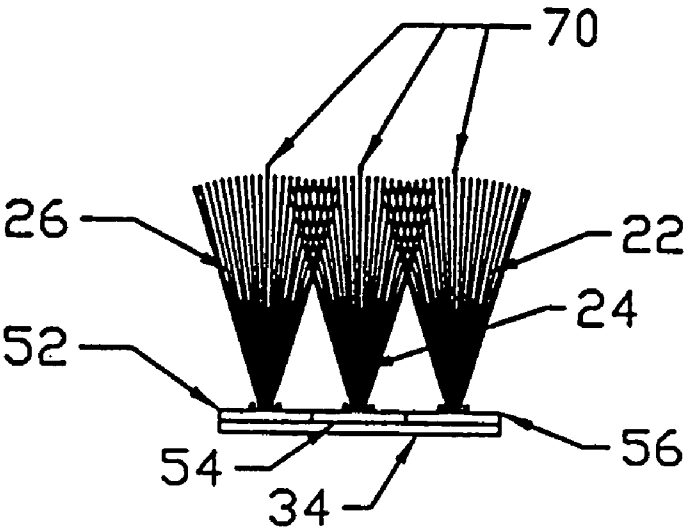
FIG. 3 is an end view of the dust plug made by the process shown in FIG. 1.

The automated process which provides the dimensionally stable and reliable dust plugs afforded by the invention automatically and continuously is a result of use of the tool 26. As best shown in FIG. 2, the tool 26 has a plurality of longitudinal slots 48 running from the upstream to downstream end thereof, for purposes of illustration, only three of the center ones of these slots 48 are used to guide the weatherstrips 20, 22 and 24 into edge-to-edge alignment. The edges of the weatherstrips which are aligned are the edges of the backing strips 52, 54 and 56 thereof (FIG. 3). There is sufficient width and height in the slots 48 so that the piles of the weatherstrips 20, 22 and 24 have sufficient clearance to move through the slots 48 without interference.

The tool 26 has an anvil surface 60 on which the sides of the backing strips 52, 54 and 56 from which the piles extend rest and are held in edge-to-edge alignment as the weatherstrip material is fed through the tool 26. The anvil surface 60 provides a base against which the adhesively coated side of the tape 34 is pressed with sufficient pressure to provide a firm adhesive connection.

Guides 62 and 64 provide sufficient wrap to afford the pressure necessary to adhere the tape 34 via its adhesive side to the exposed sides of the backing strips 52, 54 and 56. The guides 62 and 64 may be rollers or cylindrical stationary rods. The guide 62 is held on arms 68 attached to the anvil tool 26 at the sides thereof (FIG. 2). Another guide 70 which bears against the plain or non-adhesively coated side of the tape 34 may be used to lead the tape 34 to the guide 62.

The tape 34 may suitably be tape having a polypropylene barrier coated with a contact adhesive. A suitable adhesive is DK75LSE provided by Duraco, Inc. of Forest Park, Ill.

Figure 1A:
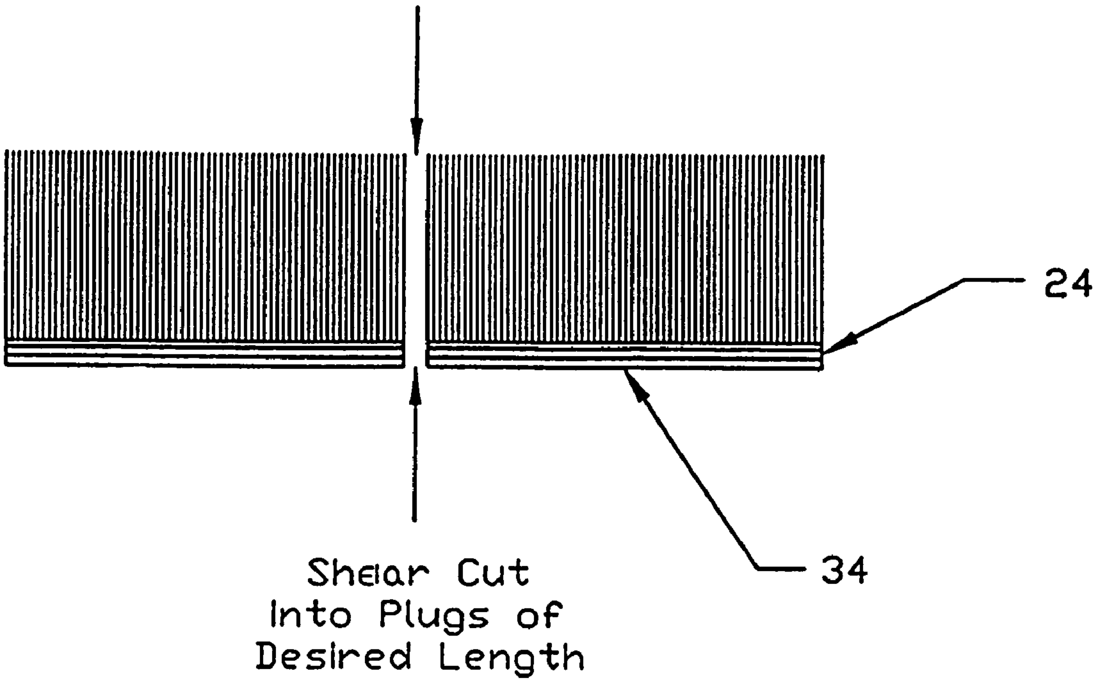
FIG. 1A is a side view of the dust plug material shown in FIG. 1 being cut into plugs of desired length.

The finished dust plug material on the reel 40 is provided to dust plug installers who then tier the dust plug material across the width thereof as shown in FIG. 1A to provide dust plugs of desired length.

Figure 4:
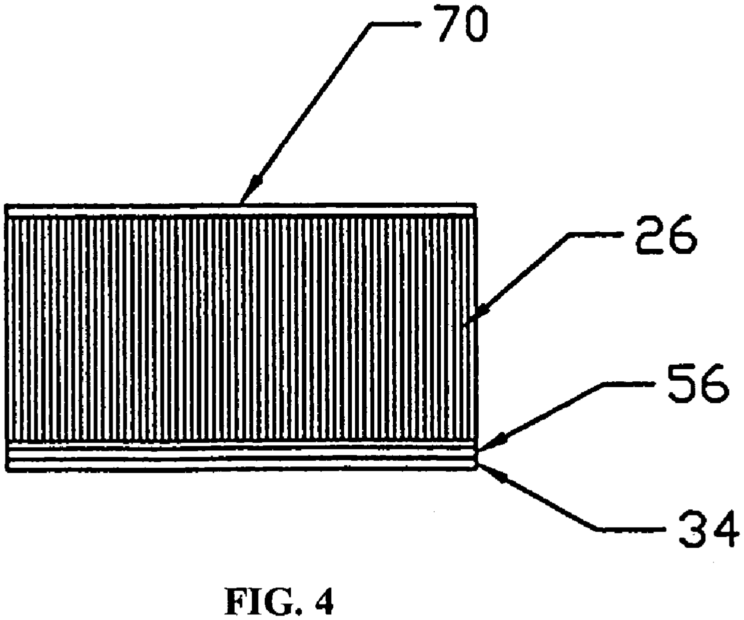
FIG. 4 is a front view of the dust plug shown in FIG. 3.

Completed dust plugs are shown in FIGS. 3 and 4. The extending piles of the weatherstrips overlap to afford a continuous surface. The weatherstrips illustrated in FIGS. 3 and 4 have internal fins 70. However, weatherstrips with external fins or without fins may also be used.

From the foregoing description it will be apparent that there has been provided improved dust plugs and apparatus for the fabrication thereof. Variations and modifications within the scope of the invention, including but not limited to those mentioned above, will undoubtedly become apparent to those skilled in the art. Accordingly the foregoing description should be taken as illustrative and not in a limiting sense.

The invention claimed is:

1. An apparatus for making pile weatherstripping dust plugs from a plurality of pile weatherstrips comprising:

a tool presenting an anvil surface;

slots extending between upstream and downstream ends of the tool in the direction of travel there through of the weatherstrips, in which the slots extend to the anvil surface and said slots receive the weatherstrips with the edges of their backings in edge-to-edge alignment;

means for guiding a tape having a contact adhesive on a side thereof into contacting relationship with sides of said aligned backing strips which are exposed on said anvil surface; and means for synchronously advancing tape and said weatherstrips through said tool in a direction from the upstream to downstream ends of said tooling.

2. The apparatus according to claim 1 further comprising means for engaging and pulling said tape and said weatherstrips leaving said tool at the downstream end thereof.

3. The apparatus according to claim 2 wherein said engaging and pulling means comprises pulling means affording contra-rotating belts defining a nip through which the weatherstrips and tape passes.

4. The apparatus according to claim 1 wherein said guiding means is provided by guides disposed upstream and downstream of said tool adjacent to the upstream and downstream ends thereof for guiding said tape and said weatherstrips onto said anvil surface and into said slots and out of said slots after assembly thereof into said dust plug.

5. The apparatus according to claim 1 further comprising spools at the upstream end of said apparatus from which said pile weatherstripping is unwound, and a spool at the downstream end of said apparatus onto which said dust plug material is wound.

6. An apparatus for making pile weatherstripping dust plugs from a plurality of pile weatherstrips comprising:

a tool presenting an anvil surface;

slots extending between upstream and downstream ends of the tool in the direction of travel there through of the weatherstrips, in which the slots extend to the anvil surface and said slots receive the weatherstrips with the edges of their backings in edge-to-edge alignment;

guides contacting said tape and disposed adjacent said tool guiding a tape having a contact adhesive on a side thereof into contacting relationship with sides of said aligned backing strips which are exposed on said anvil surface; and said tape and weatherstrips being driven together such that said tape and weatherstrips are driven synchronously through said tool in a direction from the upstream to downstream ends of said tool.

* * * * *